US009964633B1

(12) United States Patent
Freebersyser et al.

(10) Patent No.: US 9,964,633 B1
(45) Date of Patent: May 8, 2018

(54) AIRBORNE INFRARED COUNTERMEASURES SYSTEMS AND METHOD FOR ESTABLISHING AN INFRARED COMMUNICATIONS LINK BETWEEN AIRBORNE INFRARED COUNTERMEASURES SYSTEMS

(71) Applicant: Raytheon BBN Technologies Corp., Cambridge, MA (US)

(72) Inventors: James A. Freebersyser, Chanhassen, MN (US); Michael Joseph Geile, Bastavia, OH (US)

(73) Assignee: Raytheon BBN Technologies Corp., Cambridge, MA (US)

( * ) Notice: Subject to any disclaimer, the term of this patent is extended or adjusted under 35 U.S.C. 154(b) by 332 days.

(21) Appl. No.: 14/707,120

(22) Filed: May 8, 2015

Related U.S. Application Data

(60) Provisional application No. 61/991,119, filed on May 9, 2014.

(51) Int. Cl.
*G02F 1/01* (2006.01)
*G01S 7/495* (2006.01)

(52) U.S. Cl.
CPC .................... *G01S 7/495* (2013.01)

(58) Field of Classification Search
CPC ........................................... G01S 7/495
USPC ......................................... 250/330
See application file for complete search history.

(56) References Cited

U.S. PATENT DOCUMENTS 6,400,903 B1 * 6/2002 Conoval ............ H04N 5/23203
348/E5.043

7,424,225 B1 * 9/2008 Elliott ................ H04B 10/1149
398/115
9,429,833 B1 * 8/2016 Satoh ....................... G06F 3/042
2003/0043763 A1 * 3/2003 Grayson ............... H04L 1/1867
370/329
2011/0069145 A1 * 3/2011 Weber ....................... G06T 7/70
348/36

(Continued)

FOREIGN PATENT DOCUMENTS

WO        WO 9325926 A1 * 12/1993  ............. G02B 13/06

OTHER PUBLICATIONS

Derwent English statement for WO 93/25926 A1.*

*Primary Examiner* — David Porta
*Assistant Examiner* — Mamadou Faye
(74) *Attorney, Agent, or Firm* — Schwegman Lundberg & Woessner, P.A.

(57) ABSTRACT

During flight, a military aircraft can use an infrared countermeasures (IRCM) system. The IRCM system can use a wide field of view sensor to detect a spectral signature of a missile and record a coarse estimate of the angular location of the missile. Upon such detection, the IRCM system can trigger a narrow field of view sensor to more finely determine the angular location of the missile. The narrow field of view sensor can emit infrared light toward the missile, which can confuse the guidance system of the missile and can help redirect the missile away from the aircraft. During time intervals when the narrow field of view sensor is not actively locating a missile, the IRCM system can use the narrow field of view sensor to form an infrared communications link with a corresponding narrow field of view sensor of a corresponding IRCM system of another aircraft.

20 Claims, 11 Drawing Sheets

(56) References Cited

U.S. PATENT DOCUMENTS

2014/0368814 A1* 12/2014 Krupkin .................. F41H 11/02
356/139.08

* cited by examiner

AIRBORNE INFRARED COUNTERMEASURES SYSTEMS AND METHOD FOR ESTABLISHING AN INFRARED COMMUNICATIONS LINK BETWEEN AIRBORNE INFRARED COUNTERMEASURES SYSTEMS

CROSS-REFERENCE TO RELATED APPLICATION

This application claims the benefit of U.S. Provisional Application No. 61/991,119, filed on May 9, 2014, titled "SYSTEM AND METHODS FOR INFRARED COUNTERMEASURES COMMUNICATIONS", and incorporated by reference herein in its entirety.

TECHNICAL FIELD

Embodiments pertain to optical communications, such as infrared communications. Some embodiments pertain to Infrared Countermeasures (IRCM) and IRCM-based communications.

BACKGROUND

Some military aircraft include Infrared Countermeasures (IRCM) systems to protect against infrared guided anti-aircraft missiles. Such IRCM systems can detect the presence of a missile directed toward the aircraft, and in response, can emit infrared light toward the missile. The emitted light can confuse the infrared-guided navigation system of the missile, which can redirect the missile away from the aircraft.

SUMMARY

In some embodiments, an infrared countermeasures system can include a wide field of view sensor configured to receive infrared light from any direction; a narrow field of view sensor configured to receive and emit infrared light along a repositionable direction, the narrow field of view sensor including a pointing actuator configured to controllably reposition the narrow field of view sensor along the repositionable direction; and a controller configured to receive and process data outputs from the wide field of view sensor and the narrow field of view sensor, provide a data input for the narrow field of view sensor, and provide a data input for the pointing actuator.

In some of these embodiments, the controller can configure the wide field of view sensor and the narrow field of view sensor to: emit first infrared light from the narrow field of view sensor toward a remote infrared countermeasures system, the first infrared light including data representing a Request To Send and a location of the narrow field of view sensor; receive second infrared light with the wide field of view sensor from a remote narrow field of view sensor, the remote narrow field of view sensor being associated with the remote infrared countermeasures system, the second infrared light including data representing a Clear To Send and a location of the remote narrow field of view sensor; and point the narrow field of view sensor toward the remote narrow field of view sensor in response to the location represented by the data in the second infrared light.

In other of these embodiments, the controller can configure the wide field of view sensor and the narrow field of view sensor to: receive first infrared light with the wide field of view sensor from a remote narrow field of view sensor associated with a remote infrared countermeasures system, the first infrared light including data representing a Request To Send and a location of the remote narrow field of view sensor; point the narrow field of view sensor toward the remote narrow field of view sensor in response to the location represented by the data in the first infrared light; and emit second infrared light from the narrow field of view sensor toward the remote narrow field of view sensor, the second infrared light including data representing a Clear To Send and a location of the narrow field of view sensor.

In some embodiments, a method for establishing an infrared communications link between airborne local and remote infrared countermeasures systems, the local and remote infrared countermeasures systems including respective local and remote wide field of view sensors configured to receive infrared light from any direction and respective local and remote narrow field of view sensors configured to receive and emit infrared light along a repositionable direction, the method can comprise: emitting first infrared light from the local narrow field of view sensor toward the remote infrared countermeasures system, the first infrared light including data representing a Request To Send and a location of the local narrow field of view sensor; receiving second infrared light from the remote narrow field of view sensor with the local wide field of view sensor, the second infrared light including data representing a Clear To Send and a location of the remote narrow field of view sensor; pointing the local narrow field of view sensor toward the remote narrow field of view sensor in response to the location represented by the data in the second infrared light; and exchanging infrared light communication between the local and remote narrow field of view sensors, the infrared light communication including data representing at least Data Packets and Acknowledgements of receipt of the Data Packets.

In some embodiments, a computer-readable storage medium storing instructions executable by one or more processors of an infrared countermeasures system, the instructions can configure the one or more processors to: instruct a narrow field of view sensor to emit first infrared light toward a remote infrared countermeasures system, the first infrared light including data representing a Request To Send and a location of the narrow field of view sensor; process second infrared light received by a wide field of view sensor, the second infrared light including data representing a Clear To Send and a location of a remote narrow field of view sensor associated with the remote infrared countermeasures system; instruct the narrow field of view sensor to point toward the remote narrow field of view sensor in response to the location represented by the data in the second infrared light; and exchange infrared light communication between the narrow field of view sensor and the remote narrow field of view sensor, the infrared light communication including data representing at least Data Packets and Acknowledgements of receipt of the Data Packets.

This Summary is intended to provide an overview of subject matter of the present patent application. It is not intended to provide an exclusive or exhaustive explanation of the invention. The Detailed Description is included to provide further information about the present patent application.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

During flight, a military aircraft can use an infrared countermeasures (IRCM) system. The IRCM system can use a wide field of view sensor to detect a spectral signature of a missile and record a coarse estimate of the angular location of the missile. Upon such detection, the IRCM system can trigger a narrow field of view sensor to more finely determine the angular location of the missile. The narrow field of view sensor can emit infrared light toward the missile, which can confuse the guidance system of the missile and can help redirect the missile away from the aircraft. During time intervals when the narrow field of view sensor is not actively locating a missile, the IRCM system can use the narrow field of view sensor to form an infrared communications link with a corresponding narrow field of view sensor of a corresponding IRCM system of another aircraft. While the infrared communications link is operational, the IRCM system can continue using the wide field of view sensor to look for missiles. Upon detection of such a missile, the IRCM system can cease operation of the infrared communications link and can trigger the narrow field of view sensor to determine the angular location of the missile.

Using the narrow field of view sensor to form the infrared communications link can have several advantages. For example, such an infrared communications link can use existing hardware of the IRCM system, such as the narrow field of view sensor, which would otherwise be idle. As another example, such an infrared communications link can be more difficult to detect from the ground or from non-friendly aircraft, due to the relatively precise positioning of the emitted infrared light from the narrow field of view sensor. These are but two examples; other advantages are also possible.

Figure 1:
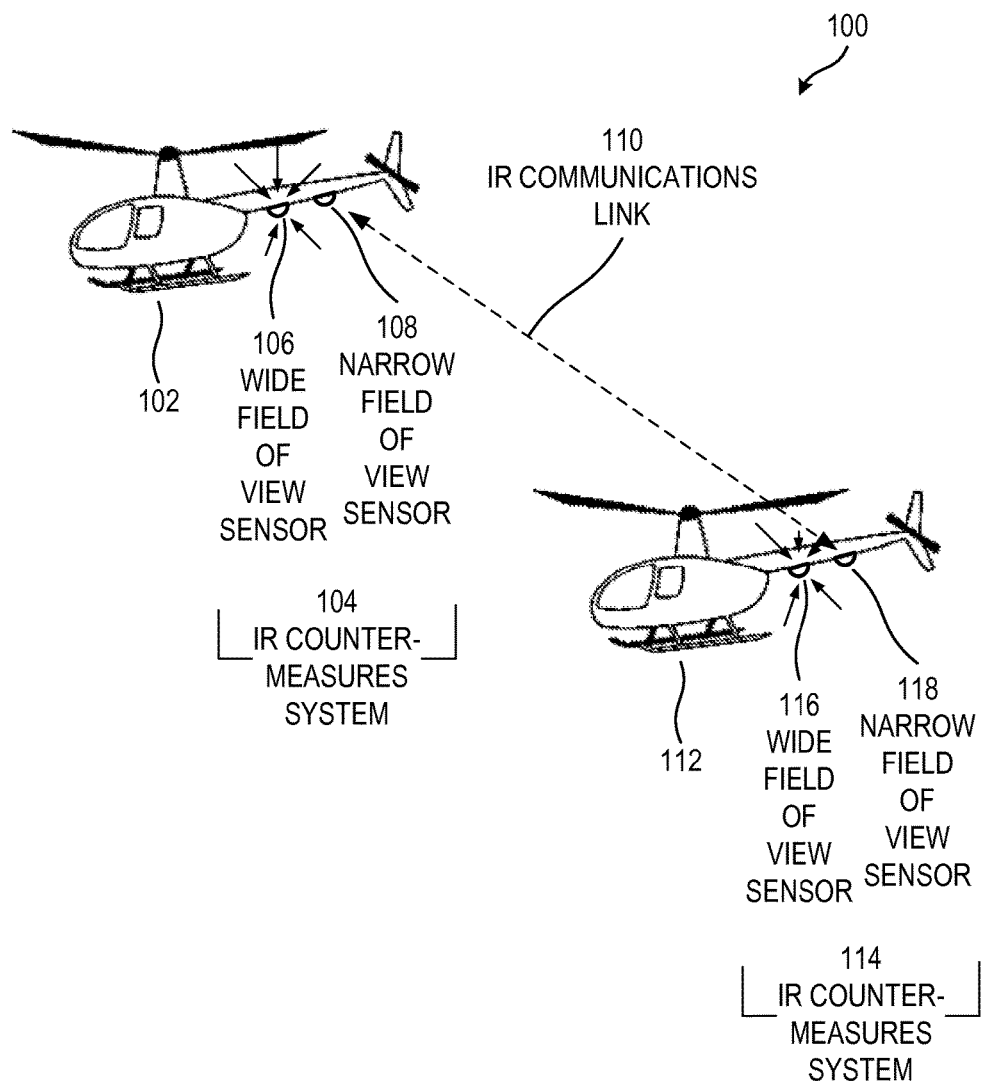
FIG. 1 shows an example of a system in which airborne military aircraft can form an infrared communications link between their respective infrared countermeasures (IRCM) systems, in accordance with some embodiments.

FIG. 1 shows an example of a system 100 in which airborne military aircraft 102, 112 can form an infrared communications link 110 between their respective infrared countermeasures (IRCM) systems 104, 114, in accordance with some embodiments.

Aircraft 102 can include an infrared countermeasures system 104. During operation, the infrared countermeasures system 104 can detect the infrared spectral signature of a missile, or other guided projectile. In response to the detected spectral signature, the infrared countermeasures system 104 can emit infrared light toward the missile. The emitted infrared light can confuse the guidance system of the missile and can help redirect the missile away from the aircraft 102. Aircraft 102 can also include one or more radio transceivers, which can communicate by radiofrequency with other aircraft. In practice, the aircraft can avoid radio transmission when the aircraft is in dangerous terrain, because the radio transmissions are more easily detected than the directional infrared light beams discussed below.

In FIG. 1, the infrared countermeasures system 104 is shown as being attached to the underside of a body of the aircraft 102. In practice, an infrared countermeasures system 104 can have any suitable location on or in the aircraft 102. In some examples, the infrared countermeasures system 104 can have multiple elements on or in the aircraft 102.

The infrared countermeasures system 104 can include a wide field of view sensor 106 and a narrow field of view sensor 108. During operation of the infrared countermeasures system 104, the wide field of view sensor 106 can receive light from all directions around the aircraft 102. When the wide field of view sensor 106 detects the spectral signature of a missile, the infrared countermeasures system 104 records a location of the missile in the field of view, and activates the narrow field of view sensor 108. The infrared countermeasures system 104 can reposition the narrow field of view sensor 108 to point in any direction around the aircraft 102. When the wide field of view sensor 106 detects a missile, the infrared countermeasures system 104 points the narrow field of view sensor 108 toward the recorded location of the missile. The infrared countermeasures system 104 can include an actuator that can actively reposition the narrow field of view sensor 108 to follow the path of the missile. The narrow field of view sensor 108 can emit infrared light toward the missile, which can confuse the guidance system of the missile and can help redirect the missile away from the aircraft 102.

During normal operation of the aircraft, when there are no missiles present, the wide field of view sensor 106 does not detect the spectral signature of a missile anywhere in the full field of view around the aircraft 102, and the infrared countermeasures system 104 does not use the narrow field of view sensor 108 to perform countermeasures. During this time (e.g., when there are no missiles present), the aircraft 102 can use the narrow field of view sensor 108 to form an infrared communications link 110 with another aircraft 112, which also includes an infrared countermeasures system 114 having a wide field of view sensor 116 and a narrow field of view sensor 118.

Figure 2:
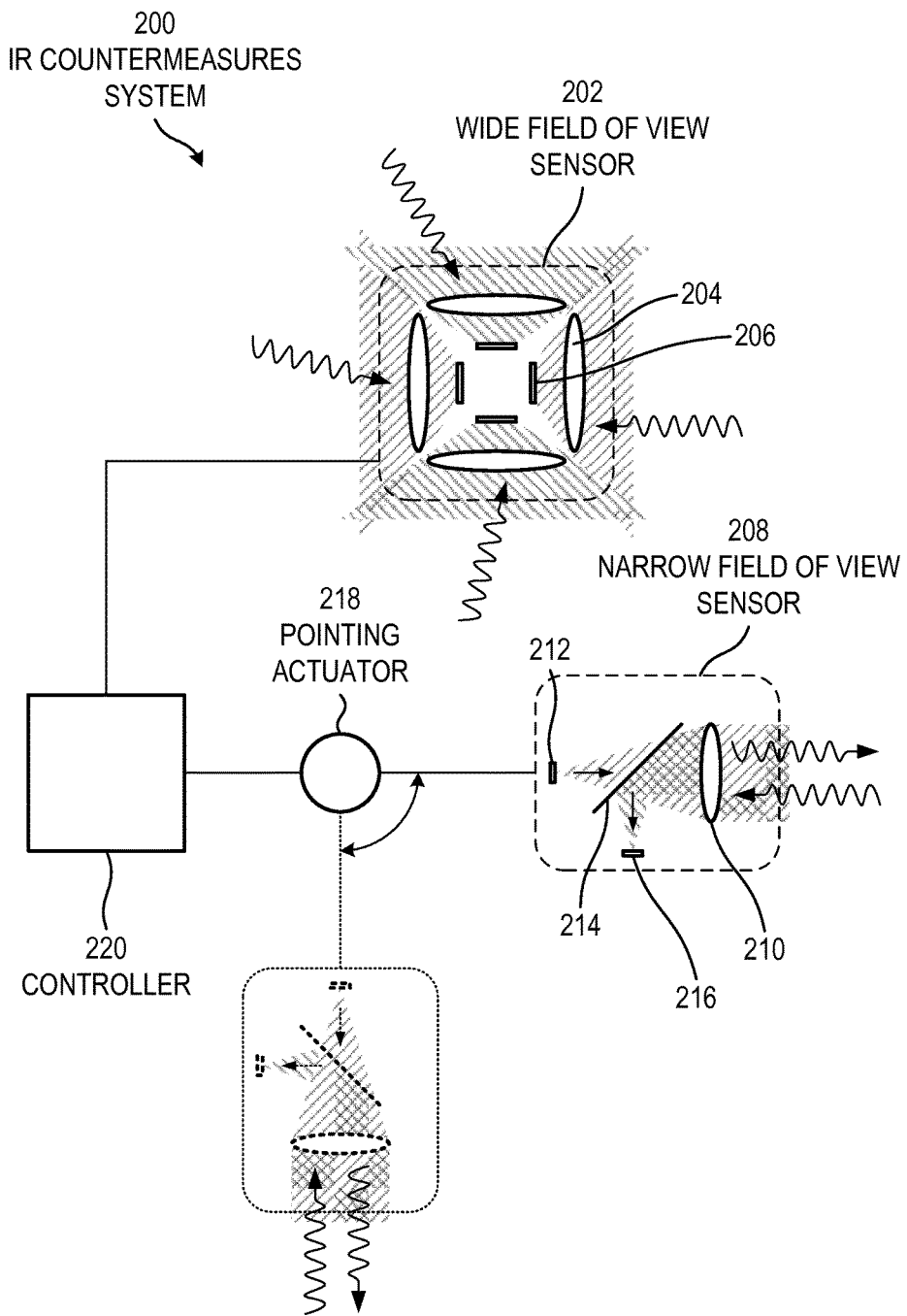
FIG. 2 shows an example of an infrared countermeasures system, in accordance with some embodiments.

FIG. 2 shows an example of an infrared countermeasures system 200, in accordance with some embodiments. Such a system 200 can be used in the aircraft 102, 112 of FIG. 1, although other suitable systems can also be used.

A wide field of view sensor 202 can be configured to receive infrared light from any direction. There are many possible configurations for the wide field of view sensor 202. In some configurations, the wide field of view sensor 202 includes at least one wavelength-sensitive filter, at least one focusing lens, at least one imaging sensor disposed at a focal plane of a respective focusing lens, and electronics that can amplify and process electrical signals from the imaging sensor(s). In some configurations, the wide field of view sensor 202 can produce a serial binary bit stream as its output. FIG. 2 shows a specific example for the wide field of view sensor 202 configuration.

In the example of FIG. 2, wide field of view sensor 202 includes multiple lenses 204 and detectors 206, which together form a plurality of optical subsystems having a combined field of view that can extend fully around an aircraft. Specifically, the wide field of view sensor 202 can have a field of view that extends in a full 4π steradian solid angle. In some examples, the wide field of view sensor 202 can include multiple wide field of view subsystems, where each wide field of view subsystem has a field of view less than the full 4π steradian solid angle. In some examples, the lenses 204 and detectors 206 are housed in a common housing. In other examples, the lenses 204 and detectors 206 are housed in a plurality of discrete housings, optionally at different locations on or in the aircraft, in order to obtain the full 4π steradian field of view. In some examples, the detectors 206 can be multi-pixel detectors. In some examples, the wide field of view sensor 202 can additionally include one or more spectral filters that can be used to determine if a missile is present in the field of view of the wide field of view sensor 202. For example, the infrared countermeasures system 200 can use a ratio of light at two specified wavelengths to determine if a missile is present. In some examples, at least one of the specified wavelengths is in the infrared portion of the electromagnetic spectrum. If the ratio exceeds a particular threshold, the infrared countermeasures system 200 can determine that a missile is present, and can activate suitable countermeasures. In some examples, the wide field of view sensor 202 can additionally include one or more wavelength-sensitive beamsplitters, which can split an incoming beam of light into two portions and direct the two portions onto respective detectors. The ratio can be formed from as a ratio of signals from the two detectors. In some examples, one or more beamsplitters can split the incoming beam of light into more than two portions. In some examples, the infrared countermeasures system 200 can use more than two wavelengths to determine if a missile is present. This is but one example of a configuration for a wide field of view sensor 202, which can receive infrared light from any direction. Other suitable configurations can also be used.

A narrow field of view sensor 208 can be configured to receive and emit infrared light along a repositionable direction. In some examples, the narrow field of view sensor 208 can be configured to receive and emit infrared light along a repositionable direction within the full 4π steradian solid angle. In some examples, the narrow field of view sensor 208 can include multiple narrow field of view subsystems, where each narrow field of view subsystem is repositionable over less than the full 4π steradian solid angle.

There are many possible configurations for the receiver portion of the narrow field of view sensor 208. In some configurations, the receiver portion can include at least one wavelength-sensitive filter, at least one focusing lens, at least one imaging sensor disposed at or near a focal plane of a respective focusing lens, and electronics that can amplify and process electrical signals from the imaging sensor(s). In some configurations, the receiver portion can produce a serial binary bit stream as its output.

There are also many possible configurations for the transmitter portion of the narrow field of view sensor 208. In some configurations, the transmitter portion can include at least one focusing lens, and at least one light source, such as one or more light emitting diodes, or one or more lasers, disposed at or near a focal plane of a respective focusing lens. In some configurations, the transmitter portion can receive a serial binary bit stream as its input.

FIG. 2 shows a specific example for the wide field of view sensor 202 configuration. In the example of FIG. 2, narrow field of view sensor 208 includes a lens 210, an infrared light source 212 positioned at or near a focal point of the lens 210, a beamsplitter 214 disposed between the infrared light source 212 and the lens 210, and a detector 216 positioned in an optical path reflected by the beamsplitter 214 at or near the focal point of the lens 210. In some examples, the infrared light source 212 can be a laser, such as a laser diode, an array of laser diodes, a gas laser, or another suitable light source. Light from the light source 212 can emerge from the lens 210 being collimated or nearly collimated. Elements 210-216 of the narrow field of view sensor 208 can be mounted together as a subassembly that can be pointed by a pointing actuator 218. The pointing actuator 218 can point the subassembly along a repositionable direction within the full 4π steradian solid angle. In some examples, the narrow field of view sensor 208 can include more than one actuator 218 and/or subassembly, so that each repositionable direction within the full 4π steradian solid angle can be achieved by at least one actuator 218 and/or subassembly. In some examples, the pointing actuator 218 can include two orthogonal gimbals, such as a gimbal to control elevation and a gimbal to control lateral pivot; other arrangements can also be used.

A controller 220 can be configured to receive and process the outputs from the wide field of view sensor 202 and the narrow field of view sensor 208, provide an input for the narrow field of view sensor 208, and provide an input for the pointing actuator 218. The controller 220 can be configured to perform real time processing for functions such as media access control, forward error correction, encryption, pointing, acquisition, and tracking, among others. The controller 220 can be configured to perform non-real time processing for functions such as packet formatting, transport layer, and network layer, among others. The controller 220 can be configured to receive a platform pose, such as Global Positioning System or Inertial Navigation System. The controller 220 can be configured to receive and send Data Packets to one or more applications, such as data sources or data sinks, through Ethernet, Universal Serial Bus, and other suitable connections.

In some examples, the controller 220 can be implemented in one or a combination of hardware, firmware and software. Embodiments may also be implemented as instructions stored on a computer-readable storage device, which may be read and executed by at least one processor to perform the operations described herein. A computer-readable storage device may include any non-transitory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. In some embodiments, a computer may include one or more processors and may be configured with instructions stored on a computer-readable storage device.

FIGS. 3-10 show a sequence of transmissions and receptions that can be used to establish an infrared communications link between aircraft, such as link 110 (FIG. 1). In each of FIGS. 3-10, aircraft 102 and 112 are designated as local and remote for convenience, although any other suitable designations, such as remote and local, or first and second, can also be used. Aircraft 102 can be considered to be a local aircraft 102, with a local infrared countermeasures system 104 having a local wide field of view sensor 106 and a local narrow field of view sensor 108. Aircraft 112 can be considered to be a remote aircraft, with a remote infrared countermeasures system 114 having a remote wide field of view sensor 116 and a remote narrow field of view sensor 118.

Figure 3:
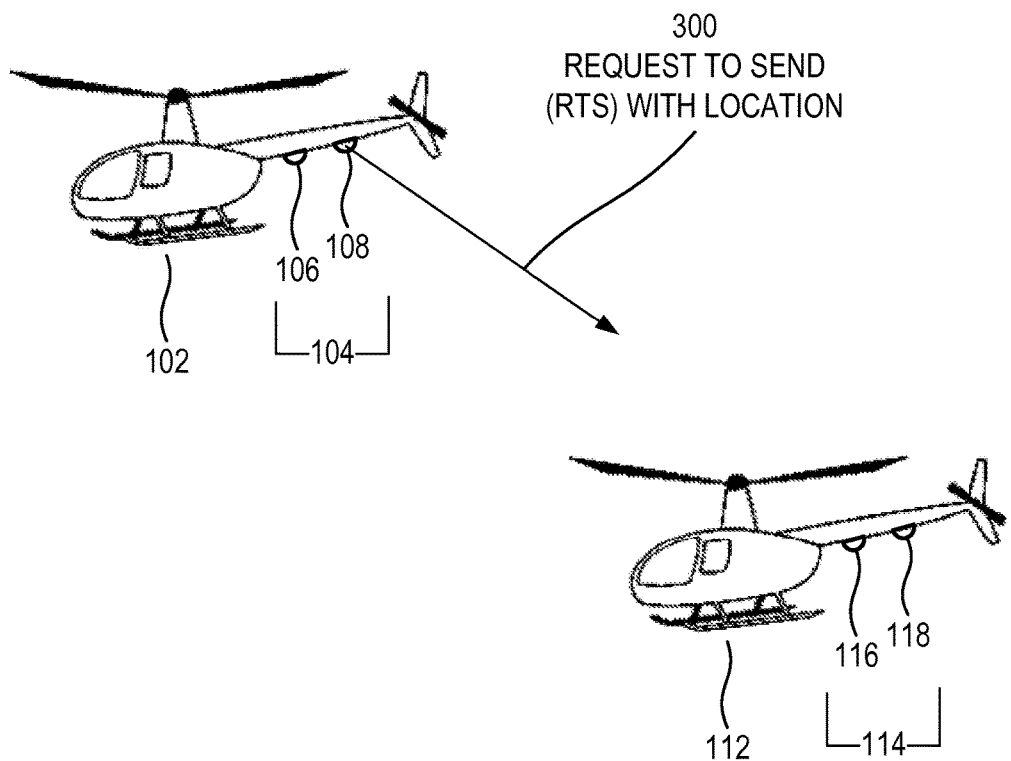
FIG. 3 shows an example of an operation, in accordance with some embodiments, in which the local narrow field of view sensor emits first infrared light toward the remote infrared countermeasures system.

FIG. 3 shows an example of an operation, in accordance with some embodiments, in which the local narrow field of view sensor 108 emits first infrared light 300 toward the remote infrared countermeasures system 114. The first infrared light 300 can include data representing a Request To Send and a location of the local narrow field of view sensor 108. The data can be encoded digitally as a signal on the first infrared light 300, such as with pulse position modulation or pulse width modulation; other digital or analog encoding mechanisms can also be used. In some example, the data can be encrypted. Such encoding and optional encryption can also be used in a similar manner for additional infrared light beams, as discussed below.

Figure 4:
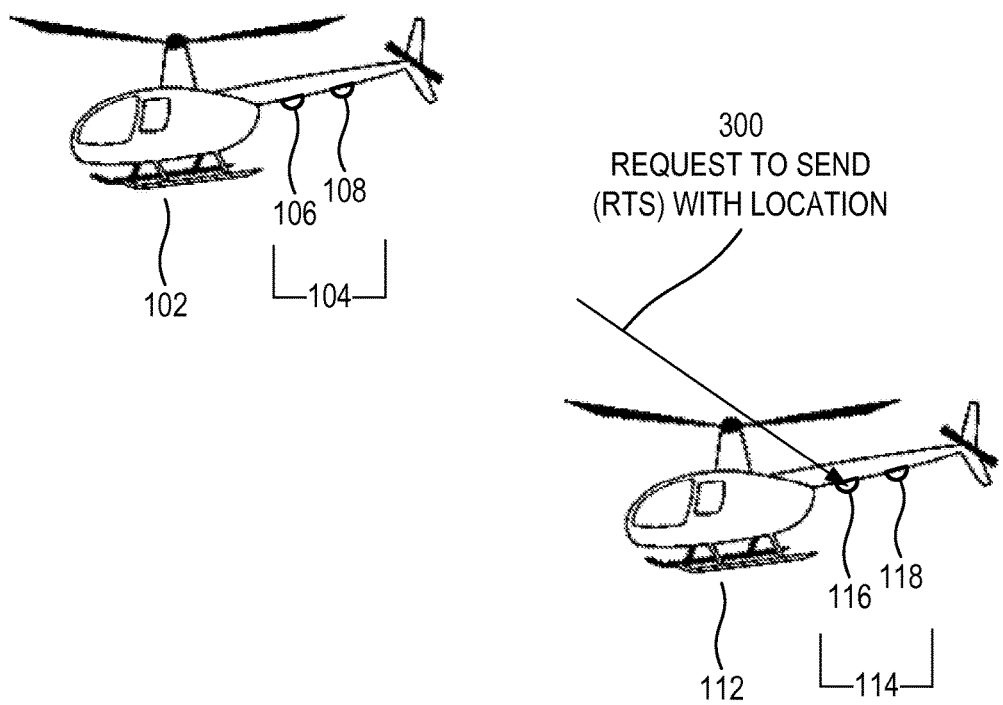
FIG. 4 shows an example of an operation, in accordance with some embodiments, in which the remote wide field of view sensor receives the first infrared light from the local narrow field of view sensor.

FIG. 4 shows an example of an operation, in accordance with some embodiments, in which the remote wide field of view sensor 116 receives the first infrared light 300 from the local narrow field of view sensor 108. A processor of the remote infrared countermeasures system 114 can recognize the first infrared light 300 as being intended for communication, can interpret the Request To Send, can point the remote narrow field of view sensor 118 toward the local narrow field of view sensor 108, and can send a Clear To Send back to the local infrared countermeasures system 104.

Figure 5:
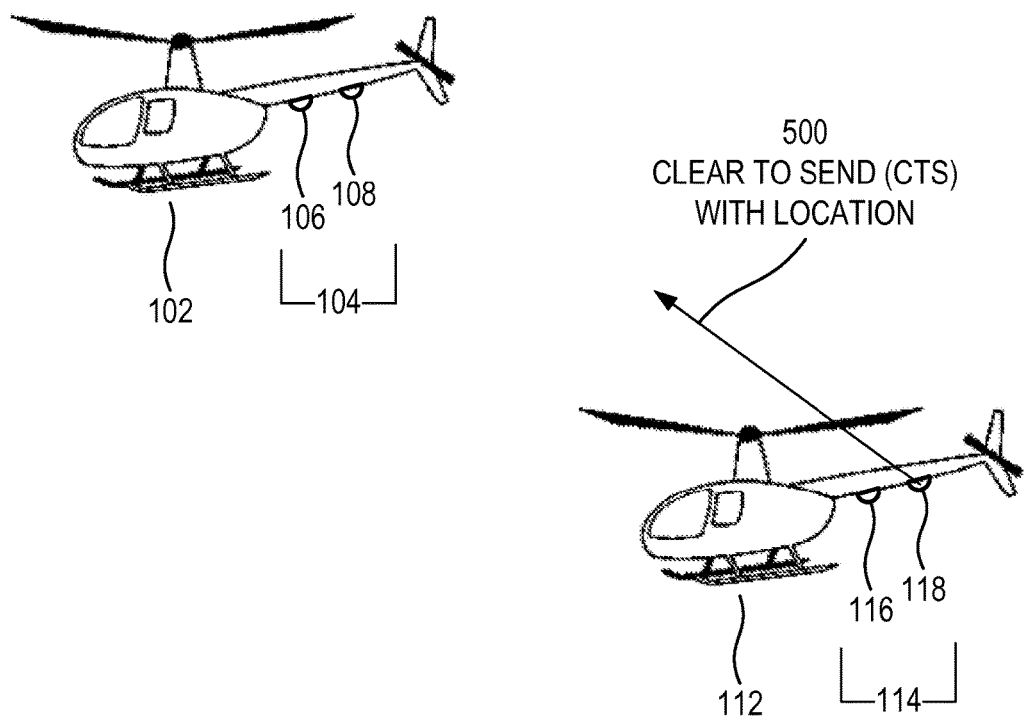
FIG. 5 shows an example of an operation, in accordance with some embodiments, in which the remote narrow field of view sensor emits second infrared light toward the local infrared countermeasures system, and, optionally toward the local narrow field of view sensor.

FIG. 5 shows an example of an operation, in accordance with some embodiments, in which the remote narrow field of view sensor 118 emits second infrared light 500 toward the local infrared countermeasures system 104, and, optionally toward the local narrow field of view sensor 108. In some examples, the remote infrared countermeasures system 114 can have sufficient location information to emit directly to the local narrow field of view sensor 108; in other examples, the location information may not be as precise, and may allow the remote infrared countermeasures system 114 to emit to the local infrared countermeasures system 104 but not directly to the local narrow field of view sensor 108. There can be one or more subsequent fine-tuning operations, which fine-tune the pointing between the narrow field of view sensors 108, 118. The second infrared light 500 can include data representing the Clear To Send and a location of the local narrow field of view sensor 118.

Figure 6:
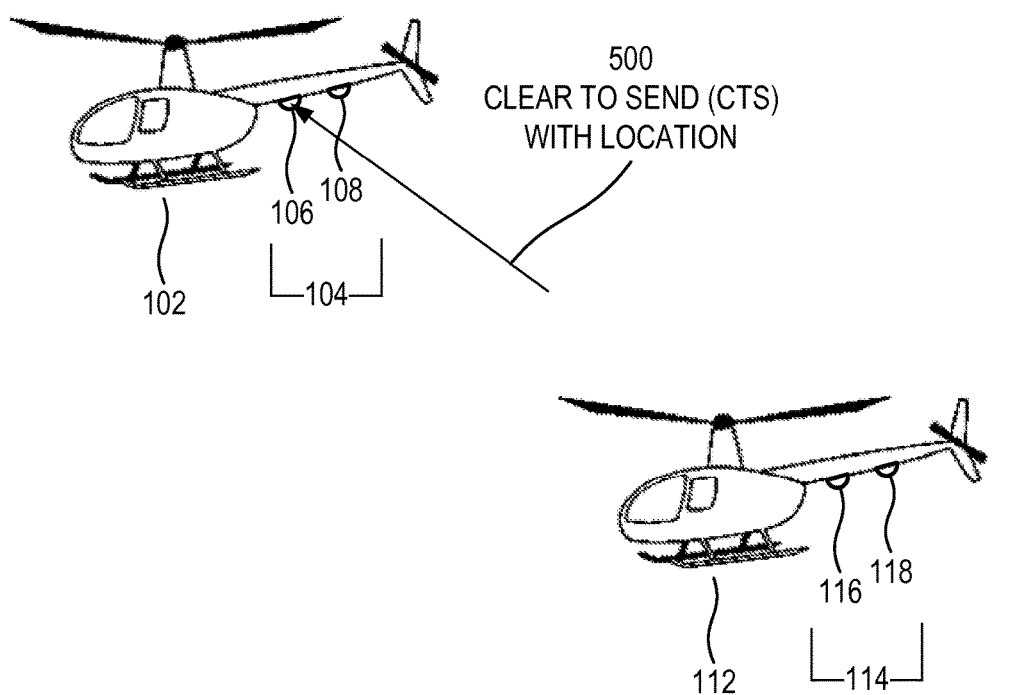
FIG. 6 shows an example of an operation, in accordance with some embodiments, in which the local wide field of view sensor receives the second infrared light from the remote narrow field of view sensor.

FIG. 6 shows an example of an operation, in accordance with some embodiments, in which the local wide field of view sensor 106 receives the second infrared light 500 from the remote narrow field of view sensor 118. A processor of the local infrared countermeasures system 104 can recognize the second infrared light 500 as being intended for communication, can interpret the Clear To Send, can point the local narrow field of view sensor 108 toward the remote narrow field of view sensor 118, and can begin to send Data Packets to the remote infrared countermeasures system 114. In some examples, the local and remote narrow field of view sensors can dynamically fine-tune their pointing angles toward one another in an ongoing manner, which can extend through and beyond operations that follow, until the communications link is ceased.

Figure 7:
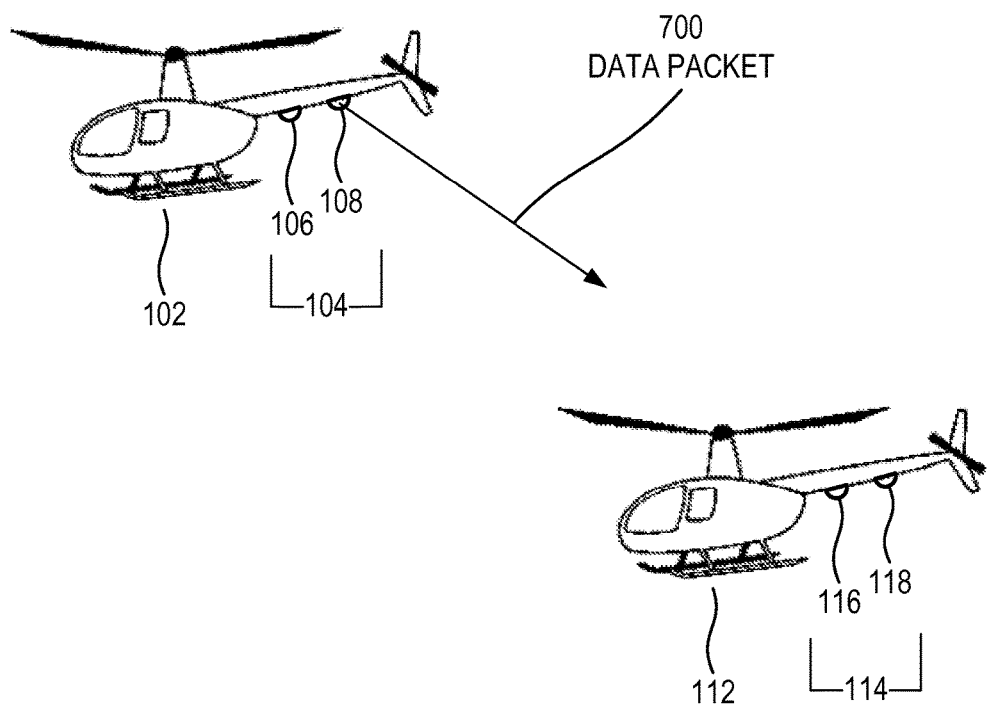
FIG. 7 shows an example of an operation, in accordance with some embodiments, in which the local narrow field of view sensor emits third infrared light toward the remote narrow field of view sensor.

FIG. 7 shows an example of an operation, in accordance with some embodiments, in which the local narrow field of view sensor 108 emits third infrared light 700 toward the remote narrow field of view sensor 118. The third infrared light 700 can include data representing at least a transmitted Data Packet.

Figure 8:
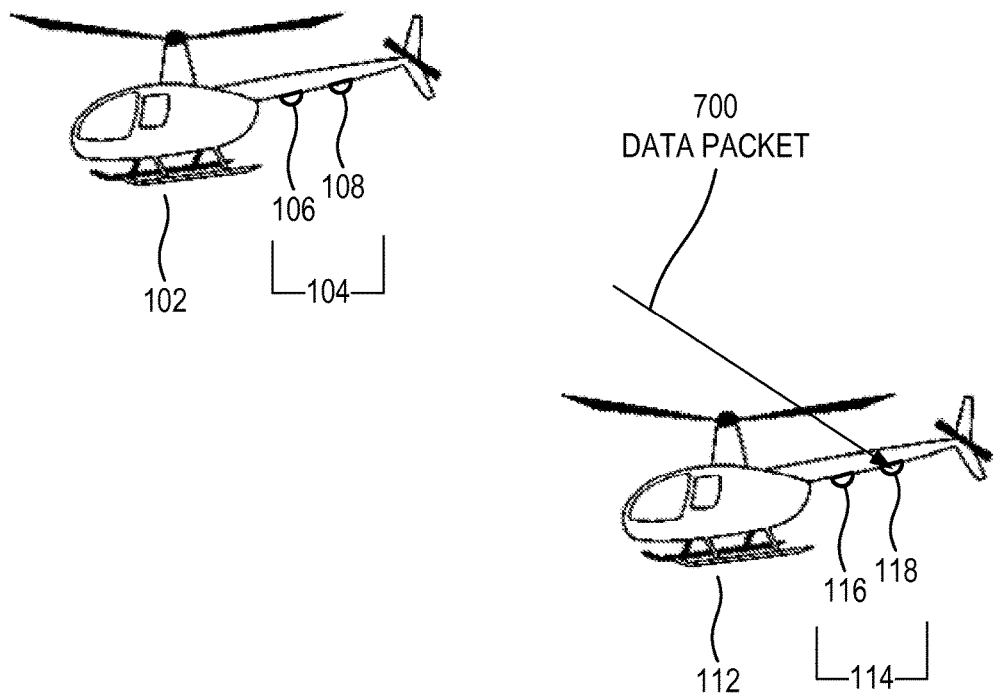
FIG. 8 shows an example of an operation, in accordance with some embodiments, in which the remote narrow field of view sensor receives the third infrared light from the local narrow field of view sensor.

FIG. 8 shows an example of an operation, in accordance with some embodiments, in which the remote narrow field of view sensor 118 receives the third infrared light 700 from the local narrow field of view sensor 108. The processor of the remote infrared countermeasures system 114 can recognize the third infrared light 700 as being intended for communication, can interpret the Data Packet(s), and can formulate an Acknowledgement to send back to the local infrared countermeasures system 104.

Figure 9:
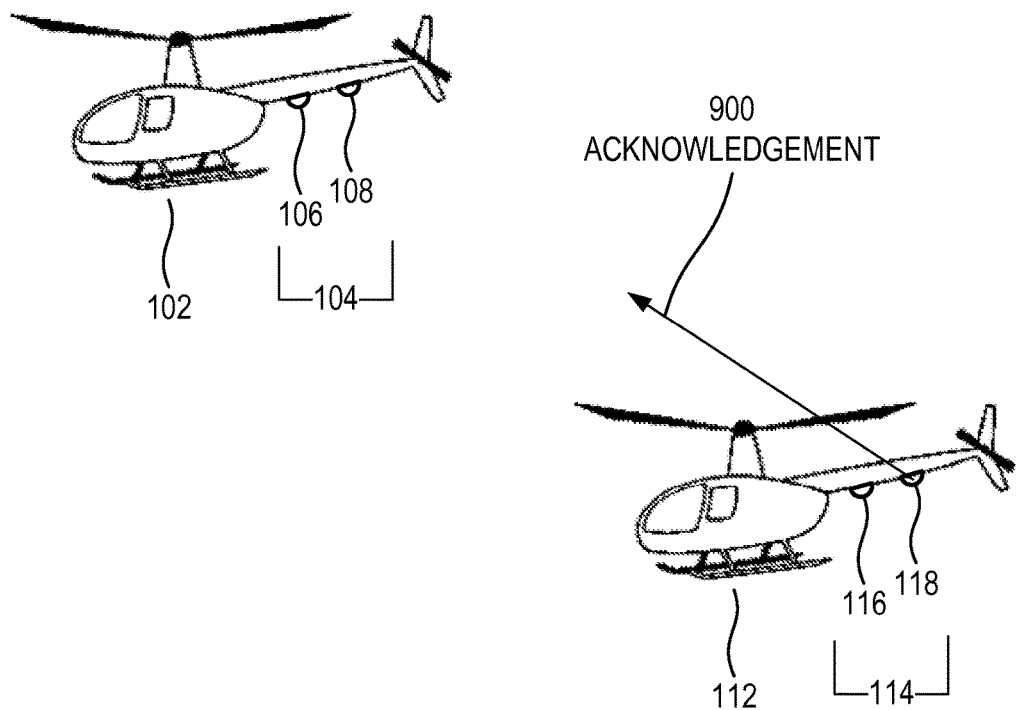
FIG. 9 shows an example of an operation, in accordance with some embodiments, in which the remote narrow field of view sensor emits fourth infrared light toward the local narrow field of view sensor.

FIG. 9 shows an example of an operation, in accordance with some embodiments, in which the remote narrow field of view sensor 118 emits fourth infrared light 900 toward the local narrow field of view sensor 108. The fourth infrared light 900 can include data representing at least the Acknowledgement.

Figure 10:
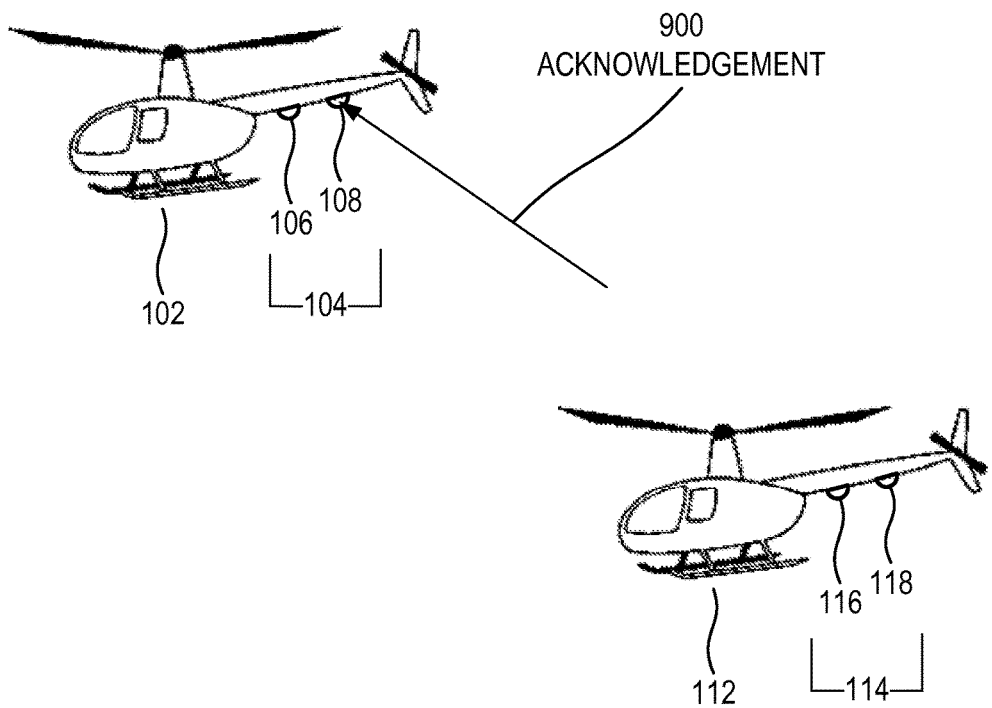
FIG. 10 shows an example of an operation, in accordance with some embodiments, in which the local narrow field of view sensor receives the fourth infrared light from the remote narrow field of view sensor.

FIG. 10 shows an example of an operation, in accordance with some embodiments, in which the local narrow field of view sensor 108 receives the fourth infrared light 900 from the remote narrow field of view sensor 118. The processor of the local infrared countermeasures system 104 can recognize the fourth infrared light 900 as being intended for communication, can interpret the Acknowledgement, and can optionally repeat the sequence of transmitting Data Packet(s) and receiving Acknowledgements, as needed. It will be understood that the remote infrared countermeasures system 114 can also send Data Packet(s) to the local infrared countermeasures system 104 and receive Acknowledgements, as needed.

As an alternative, one or all of the receiving operations involving a narrow field of view sensor can alternatively be performed on a corresponding wide field of view sensor. For instance, a wide field of view sensor can receive Data Packets and Acknowledgements, as needed.

The protocol shown in FIGS. 3-10 is an example of a media access (MAC) protocol. The specific sequence of sending and receiving the Request To Send and the Clear To Send can be referred to as the RTS/CTS protocol. Other suitable MAC protocols can alternatively be used.

Figure 11:
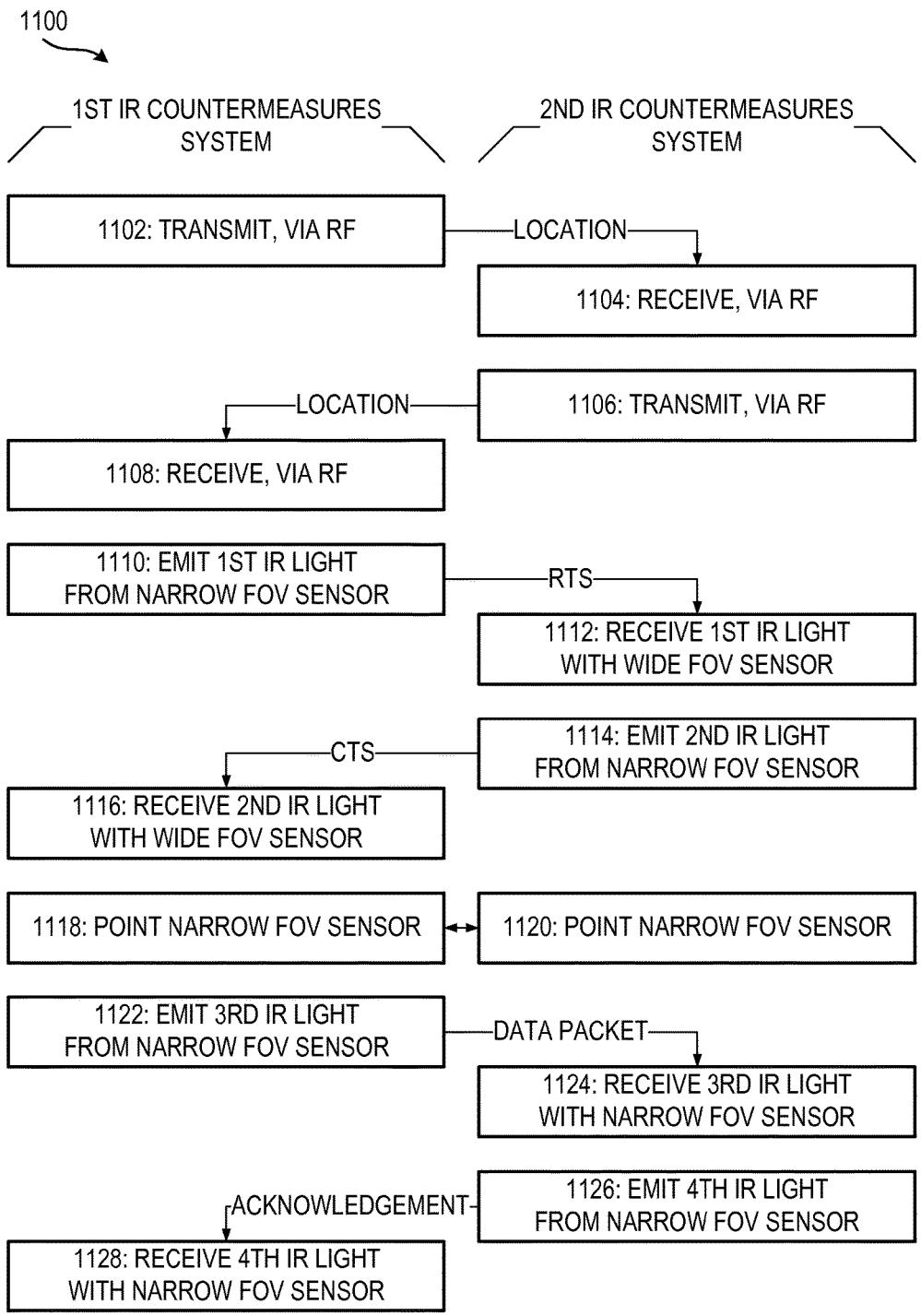
FIG. 11 shows a flow chart of an example of a method for establishing an infrared communications link between first and second infrared countermeasures systems, in accordance with some embodiments.

FIG. 11 shows a flow chart of an example of a method 1100 for establishing an infrared communications link between first and second infrared countermeasures systems, in accordance with some embodiments. In some examples, method 1100 can be executed on first and second aircraft that each includes infrared countermeasures systems, such as 200. Method 1100 is but one example; other suitable examples can also be used.

In some examples, optional operations 1102-1108 can be executed prior to take-off or shortly after take-off, when the first and second aircraft are in relative safety and can communicate by radio without fear of detection. In operations 1102-1108, the first and second aircraft exchange location information via radiofrequency.

At operation 1102, the first infrared countermeasures system can transmit, via radiofrequency communication, to the second infrared countermeasures system, data representing a location of the first infrared countermeasures system.

At operation 1104, the second infrared countermeasures system can receive, via radiofrequency communication, from the first infrared countermeasures system, data representing the location of the first infrared countermeasures system.

At operation 1106, the second infrared countermeasures system can transmit, via radiofrequency communication, to the first infrared countermeasures system, data representing a location of the second infrared countermeasures system.

At operation 1108, the first infrared countermeasures system can receive, via radiofrequency communication, from the second infrared countermeasures system, data representing the location of the remote infrared countermeasures system.

Using radiofrequency communication to set up an initial communications link is but one option. Another option can include performing an open loop sweep of the narrow field of view sensor. Still another option can include using the wide field of view sensor as an imaging device to detect other platforms and using the information from the wide field of view sensor to point the narrow field of view sensor. Other suitable setup procedures can also be used.

After optional operations 1102-1108 are executed, the first and second aircraft can fly into more dangerous terrain, in which communication has a higher risk of interception.

In operations 1110-1128, the first and second aircraft can establish an infrared communications link. The infrared communications link can utilize the highly directional narrow point of view sensors of the infrared countermeasures systems to transmit and receive signals between the aircraft. Using transmitted beams that are highly directional, such as those produced by a narrow point of view sensor in an infrared countermeasures system, can reduce the risk of interception.

The first and second infrared countermeasures systems can include respective first and second wide field of view sensors configured to receive infrared light from any direction and respective first and second narrow field of view sensors configured to receive and emit infrared light along a repositionable direction.

At operation 1110, the first infrared countermeasures system can emit first infrared light from the first narrow field of view sensor toward the second infrared countermeasures system. The first infrared light can include data representing a Request To Send (RTS) and a location of the first narrow field of view sensor.

At operation 1112, the second infrared countermeasures system can receive the first infrared light with the second wide field of view sensor. At this stage in the establishing of the communication link, the second narrow field of view sensor has not yet been engaged, and is not yet pointing toward the first infrared countermeasures system.

At operation 1114, the second infrared countermeasures system can emit second infrared light from the second narrow field of view sensor toward the first infrared countermeasures system. In some examples, the second infrared light is emitted toward the first narrow field of view sensor. In some examples, the second infrared countermeasures system can point the second narrow field of view toward the first infrared countermeasures system and/or the first narrow field of view sensor, prior to emitting the second infrared light. The second infrared light can include data representing a Clear To Send (CTS) and a location of the second narrow field of view sensor.

At operation 1116, the first infrared countermeasures system can receive the second infrared light with the first wide field of view sensor. Alternatively, at operation 1116, the first infrared countermeasures system can receive the second infrared light with the first narrow field of view sensor.

When the first and second infrared countermeasures systems have completed operations 1108-1116, the first and second infrared countermeasures systems are cleared to send and receive data along the established infrared communications link. The first and second infrared countermeasures systems will transmit and receive data between their respective narrow field of view sensors, which can both emit and detect infrared light along a repositionable direction. When operative, the first and second infrared countermeasures systems will transmit and receive data along a line connecting the first and second narrow field of view sensor.

At operation 1118, the first infrared countermeasures system can point the first narrow field of view sensor toward the second narrow field of view sensor.

At operation 1120, the second infrared countermeasures system can point the second narrow field of view sensor toward the first narrow field of view sensor. Operation 1120 can be executed before, during, or after operation 1118. Operations 1118 and 1120 can optionally be performed iteratively.

At operation 1122, the first infrared countermeasures system can emit third infrared light from the first narrow field of view sensor toward the second narrow field of view sensor. The third infrared light can include data representing at least a transmitted Data Packet. In some examples, at operation 1122, the first infrared countermeasures system can emit multiple Data Packets.

At operation 1124, the second infrared countermeasures system can receive the third infrared light with the second narrow field of view sensor.

At operation 1126, the second infrared countermeasures system can emit fourth infrared light from the second narrow field of view sensor toward the first narrow field of view sensor. The fourth infrared light can include data representing an Acknowledgement of receipt of the transmitted Data Packet or packets.

At operation 1128, the first infrared countermeasures system can receive the fourth infrared light with the first narrow field of view sensor.

In some examples, the second narrow field of view sensor can emit infrared light including data representing one or more Data Packets, the first infrared countermeasures system can receive the Data Packets, and the first narrow field of view sensor can emit infrared light including data representing an Acknowledgement of receipt of the transmitted Data Packet or packets. These transmissions (e.g., emissions of infrared light) and receptions (e.g., detections of infrared light) can be repeated, along with operations 1122-1128, for the time duration of the communications link.

There are several circumstances under which the communications link can be broken. For instance, the first or second infrared countermeasures system can terminate the link when the link is no longer needed. As another example, one of the first or second infrared countermeasures systems can detect the presence of a missile, and can use the narrow field of view sensor to direct a countermeasures beam toward the missile. When this occurs, the infrared countermeasures system can receive with the wide field of view sensor infrared light having a spectral signature corresponding to a missile, and, in response to the received spectral signature, can terminate the infrared light communication between the narrow field of view sensor and that of another infrared countermeasures system.

The above Detailed Description includes references to the accompanying drawings, which form a part of the Detailed Description. The drawings show, by way of illustration, specific embodiments in which the invention can be practiced. These embodiments are also referred to herein as "examples." Such examples can include elements in addition to those shown or described. However, the inventors also contemplate examples in which only those elements shown or described are provided. Moreover, the inventors also contemplate examples using any combination or permutation of those elements shown or described (or one or more aspects thereof), either with respect to a particular example (or one or more aspects thereof), or with respect to other examples (or one or more aspects thereof) shown or described herein. In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, kit, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects. The above description is intended to be illustrative, and not restrictive. For example, the above-described examples (or one or more aspects thereof) can be used in combination with each other. Other embodiments can be used, such as by one of ordinary skill in the art upon reviewing the above description. The Abstract is provided to allow the reader to quickly ascertain the nature of the technical disclosure. It is submitted with the understanding that it will not be used to interpret or limit the scope or meaning of the claims. Also, in the above Detailed Description, various features can be grouped together to streamline the disclosure. This should not be interpreted as intending that an unclaimed disclosed feature is essential to any claim. Rather, inventive subject matter can lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

What is claimed is:

1. An infrared countermeasures system, comprising:
   a wide field of view sensor configured to receive infrared light from any direction;
   a narrow field of view sensor configured to receive and emit infrared light along a repositionable direction, the narrow field of view sensor including a pointing actuator configured to controllably reposition the narrow field of view sensor along the repositionable direction; and
   a controller configured to receive and process data outputs from the wide field of view sensor and the narrow field of view sensor, provide a data input for the narrow field of view sensor, and provide a data input for the pointing actuator,
   the controller to configure the wide field of view sensor and the narrow field of view sensor to:
   emit first infrared light from the narrow field of view sensor toward a remote infrared countermeasures system, the first infrared light including data representing a Request To Send and a location of the narrow field of view sensor;
   receive second infrared light with the wide field of view sensor from a remote narrow field of view sensor, the remote narrow field of view sensor being associated with the remote infrared countermeasures system, the second infrared light including data representing a Clear To Send and a location of the remote narrow field of view sensor; and
   point the narrow field of view sensor toward the remote narrow field of view sensor in response to the location represented by the data in the second infrared light.

2. The infrared countermeasures system of claim 1, wherein the controller is further to configure the narrow field of view sensor to emit third infrared light toward the remote narrow field of view sensor, the third infrared light including data representing at least a transmitted Data Packet.

3. The infrared countermeasures system of claim 2, wherein the controller is further to configure the narrow field of view sensor to receive fourth infrared light from the remote narrow field of view sensor, the fourth infrared light including data representing an Acknowledgement of receipt of the transmitted Data Packet.

4. The infrared countermeasures system of claim 3, wherein the fourth infrared light further includes data representing at least a received second Data Packet.

5. The infrared countermeasures system of claim 4, wherein the controller is further to configure the narrow field of view sensor to emit fifth infrared light toward the remote narrow field of view sensor, the fifth infrared light including data representing an Acknowledgement of receipt of the received second Data Packet.

6. The infrared countermeasures system of claim 1, wherein the controller is further to configure the narrow field of view sensor to exchange infrared light communication with the remote narrow field of view sensor, the infrared light communication including data representing at least Data Packets and Acknowledgements of receipt of the Data Packets.

7. The infrared countermeasures system of claim 6, wherein the controller is further to configure the wide field of view sensor to receive infrared light having a spectral signature corresponding to a guided projectile; and in response to the received spectral signature, terminate the infrared light communication between the narrow field of view sensor and the remote narrow field of view sensor.

8. The infrared countermeasures system of claim 1,
   wherein the wide field of view sensor is configured to receive infrared light from any direction in a full $4\pi$ steradian solid angle; and
   wherein the pointing actuator is configured to reposition the narrow field of view sensor to receive and emit infrared light along a repositionable direction within the full 4π steradian solid angle.

9. An infrared countermeasures system, comprising:
a wide field of view sensor configured to receive infrared light from any direction;
a narrow field of view sensor configured to receive and emit infrared light along a repositionable direction, the narrow field of view sensor including a pointing actuator configured to controllably reposition the narrow field of view sensor along the repositionable direction; and
a controller configured to receive and process data outputs from the wide field of view sensor and the narrow field of view sensor, provide a data input for the narrow field of view sensor, and provide a data input for the pointing actuator,
the controller to configure the wide field of view sensor and the narrow field of view sensor to:
receive first infrared light with the wide field of view sensor from a remote narrow field of view sensor associated with a remote infrared countermeasures system, the first infrared light including data representing a Request To Send and a location of the remote narrow field of view sensor;
point the narrow field of view sensor toward the remote narrow field of view sensor in response to the location represented by the data in the first infrared light; and
emit second infrared light from the narrow field of view sensor toward the remote narrow field of view sensor, the second infrared light including data representing a Clear To Send and a location of the narrow field of view sensor.

10. The infrared countermeasures system of claim 9, wherein the controller is further to configure the narrow field of view sensor to receive third infrared light from the remote narrow field of view sensor, the third infrared light including data representing at least a received Data Packet.

11. The infrared countermeasures system of claim 10, wherein the controller is further to configure the narrow field of view sensor to emit fourth infrared light toward the remote narrow field of view sensor, the fourth infrared light including data representing an Acknowledgement of receipt of the received Data Packet.

12. The infrared countermeasures system of claim 11, wherein the fourth infrared light further includes data representing at least a transmitted second Data Packet.

13. The infrared countermeasures system of claim 12, wherein the controller is further to configure the narrow field of view sensor to receive fifth infrared light from the remote narrow field of view sensor, the fifth infrared light including data representing an Acknowledgement of receipt of the transmitted second Data Packet.

14. The infrared countermeasures system of claim 9, wherein the controller is further to configure the narrow field of view sensor to exchange infrared light communication with the remote narrow field of view sensor, the infrared light communication including data representing at least Data Packets and Acknowledgements of receipt of the Data Packets.

15. The infrared countermeasures system of claim 14, wherein the controller is further to configure the wide field of view sensor to receive with the wide field of view sensor infrared light having a spectral signature corresponding to a guided projectile, and in response to the received spectral signature, terminate the infrared light communication between the narrow field of view sensor and the remote narrow field of view sensor.

16. The infrared countermeasures system of claim 9,
wherein the wide field of view sensor is configured to receive infrared light from any direction in a full 4π steradian solid angle; and
wherein the pointing actuator is configured to reposition the narrow field of view sensor to receive and emit infrared light along a repositionable direction within the full 4π steradian solid angle.

17. A method for establishing an infrared communications link between airborne local and remote infrared countermeasures systems, the local and remote infrared countermeasures systems including respective local and remote wide field of view sensors configured to receive infrared light from any direction and respective local and remote narrow field of view sensors configured to receive and emit infrared light along a repositionable direction, the method comprising:
emitting first infrared light from the local narrow field of view sensor toward the remote infrared countermeasures system, the first infrared light including data representing a Request To Send and a location of the local narrow field of view sensor;
receiving second infrared light from the remote narrow field of view sensor with the local wide field of view sensor, the second infrared light including data representing a Clear To Send and a location of the remote narrow field of view sensor;
pointing the local narrow field of view sensor toward the remote narrow field of view sensor in response to the location represented by the data in the second infrared light; and
exchanging infrared light communication between the local and remote narrow field of view sensors, the infrared light communication including data representing at least Data Packets and Acknowledgements of receipt of the Data Packets.

18. The method of claim 17, further comprising:
receiving with the local wide field of view sensor infrared light having a spectral signature corresponding to a missile; and
in response to the received spectral signature, terminating the infrared light communication between the local and remote narrow field of view sensors.

19. The method of claim 17,
wherein the local and remote wide field of view sensors are configured to receive infrared light from any direction in a full 4π steradian solid angle; and
wherein the local and remote narrow field of view sensors are configured to receive and emit infrared light along a repositionable direction within the full 4π steradian solid angle.

20. A computer-readable storage medium storing instructions executable by one or more processors of an infrared countermeasures system, the instructions to configure the one or more processors to:
instruct a narrow field of view sensor to emit first infrared light toward a remote infrared countermeasures system, the first infrared light including data representing a Request To Send and a location of the narrow field of view sensor;
process second infrared light received by a wide field of view sensor, the second infrared light including data representing a Clear To Send and a location of a remote narrow field of view sensor associated with the remote infrared countermeasures system;

instruct the narrow field of view sensor to point toward the remote narrow field of view sensor in response to the location represented by the data in the second infrared light; and exchange infrared light communication between the narrow field of view sensor and the remote narrow field of view sensor, the infrared light communication including data representing at least Data Packets and Acknowledgements of receipt of the Data Packets.

\* \* \* \* \*